United States Patent [19]

Kuwabara et al.

[11] 4,201,925
[45] May 6, 1980

[54] METHOD FOR STARTING HYDRAULIC TURBINE GENERATOR

[75] Inventors: Takao Kuwabara; Hiroshi Okumura; Toshiaki Yokoyama, all of Hitachi, Japan

[73] Assignee: Hitachi, Ltd., Tokyo, Japan

[21] Appl. No.: 818,594

[22] Filed: Jul. 25, 1977

[30] Foreign Application Priority Data

Jul. 26, 1976 [JP] Japan .................................. 51-88214

[51] Int. Cl.² ............................................... H02P 9/04
[52] U.S. Cl. ........................................... 290/52; 415/1
[58] Field of Search ..................... 290/52; 60/646, 660; 415/1

[56] References Cited

U.S. PATENT DOCUMENTS

| 3,886,373 | 5/1975 | Okada | 415/1 X |
| 3,960,463 | 1/1976 | Okada et al. | 415/1 |
| 4,014,624 | 3/1977 | Takase et al. | 415/1 |
| 4,073,594 | 2/1978 | Takagi et al. | 415/1 |

*Primary Examiner*—J. V. Truhe
*Assistant Examiner*—Morris Ginsburg
*Attorney, Agent, or Firm*—Thomas E. Beall, Jr.

[57] ABSTRACT

A method for improving the starting phase of the running of a hydraulic turbine or pump turbine. According to this method, an opening of wicket gates is increased as a function of an increase in r.p.m. of a runner, so that the flow rate of water running into a runner may be maintained constant throughout acceleration and synchronizing process to the rated speed once attained said constant value at an early stage of starting.

2 Claims, 4 Drawing Figures

METHOD FOR STARTING HYDRAULIC TURBINE GENERATOR

BACKGROUND OF THE INVENTION

1. Field of the Invention

This invention relates to a method for starting a hydraulic turbine under a water head condition where there is experienced a considerably large variation in flow rate of water due to a variation in r.p.m. of a runner of a hydraulic turbine or pump turbine. (This will be referred to simply as a turbine.)

2. Description of the Prior Art

A turbine includes: a penstock adapted to introduce water from an upstream region to a downstream region; a runner which is directly coupled to the generator and rotates by water received from the penstock; two or more wicket gates for adjusting the flow rate of water running into the runner; and a draft tube adapted to introduce water from the runner to the downstream region. The flow rate of water running into the runner is adjusted by adjusting the opening of wicket gates i.e., by increasing or decreasing the opening thereof, thereby controlling the r.p.m. of the runner, i.e., the r.p.m. of a generator to a predetermined value.

Particularly in the case of a high-head pump turbine, there is noted a tendency or a phenomenon that, in case a given turbine operating point N1, i.e., $N/\sqrt{H}$ (N: r.p.m., H: effective head) is considerably large, a slight variation in effective head or r.p.m. directly leads to a large variation in flow rate of water, due to the action of centrifugal force, even though an opening of wicket gates is not varied. This tendency leads to a water hammer phenomenon in water tubes connected to the upstream and downstream regions, with the result that the turbine flow rate is varied. This establishes a cycle of such a phenomenon, i.e., a cyclic fluctuation of an output of the turbine. As a result, undesirable, noise is developed in a control system of a governor which controls the output and frequency of the generator by adjusting the opening of wicket gates. Accordingly, if the case comes to the worst, even the control function of the governor is lost, with the accompanying failure of synchronizing of the generator to the electric power transmission system.

Meanwhile, there arises a tendency at the present time that, from civil and/or economical viewpoints a long and narrow water tube is adopted, and a range of variation in water level is increased due to the use of smaller capacity upstream and downstream water reservoirs. In other words, many factors unfavorable to turbines from a viewpoint of water hammer phenomenon are being attended.

Stated differently, if these shortcomings in turbine characteristics are improved, and synchronizing of the generator may be accomplished satisfactorily, then further severe civil and/or economical requirements may be fulfilled.

The aforesaid background will be described in more detail in conjunction with FIG. 1, hereunder.

FIG. 1 is a graph representing a flow rate characteristic of a turbine, in which $N1=N/\sqrt{H}$ is along the X-axis and $Q1=Q/\sqrt{H}$ is along the Y-axis, as shown, with various openings of the wicket gates being respectively plotted as curves 1, 2, 3, 4, 5. In this respect, H represents head, Q represents flow rate, N represents r.p.m., $N/\sqrt{H}$ represents r.p.m. per unit head, and $Q/\sqrt{H}$ represents a flow rate per unit head. The opening of wicket gates is smallest as shown by a curve 1, and the opening of gates is increased in the order of curves 2, 3, 4, and 5. Assuming that an effective head H is constant, there is a tendency that turbine flow rate Q and, therefore Q1 is decreased with an increase in N and therefore a corresponding increase in N1, as shown by any one of wicket-gate opening curves 1, 2, 3, 4, 5. In this respect, a decreasing rate of the flow rate exhibits a sharp increase as N1 approaches to the rated N1 corresponding to the rated speed. In other words, under a constant rated r.p.m. (in general, a governor controls for the rated r.p.m. running), if a head is decreased, the turbine operating point is shifted from a relatively flat portion to a steep gradient portion of the curves.

Meanwhile, a no-load opening curve shows an upper limit of r.p.m. which may be achieved when increasing a wicket gate opening. In other words, as the r.p.m. is increased, a mechanical loss is increased, and water quantity is decreased due to a centrifugal force, with the resulting reduction in output of a turbine itself, so that the r.p.m. is saturated eventually. The no-load opening curve is a curve which represents saturated r.p.m.s at varying wicket gate openings. Meanwhile, in case the generator is accelerated and synchronized by a conventional means, the generator is in the first step, accelerated close to the rated r.p.m. (or synchronizing r.p.m.), then the wicket gates are controlled so as to get no load opening corresponding to the rated speed, and thereafter the wicket gates are maintained at an opening thus achieved. For instance, assume that N1 at a rated r.p.m. and at a certain head is $N_A$ (shown at A). The wicket gates are controlled so as to get an opening represented by a curve 3. Then synchronizing of the generator is commenced at a point Z, the intersection of the NA, curve 3, and the no-load opening curve.

In this respect, what is important is how to reach the point Z. FIG. 2 shows cases I and II, representing the conventional methods for starting the turbine/generator. According to the case I, the wicket gates are first opened to a so-called starting opening which is slightly larger than the no-load opening at a rated r.p.m. Then, the wicket gates are held in this condition. Meanwhile, when a turbine is started and accelerated to a given r.p.m., the governing action of a governor is commenced so as to automatically adjust the r.p.m. to a rated value, with the result that the wicket gates are brought down to and maintained at thereafter at the no-load opening at the rated r.p.m. and then the generator is synchronized there. According to this method, the opening of wicket gates is increased to an extent which is sufficiently larger than the no-load opening of wicket gates at the rated r.p.m., for rapid acceleration of the r.p.m. However, an excessively large opening of the wicket gates leads to overshooting of r.p.m., thereby increasing the time for matching of speeds. In contrast thereto, according to the case II, the wicket gates are opened gradually from their rest condition for increasing the r.p.m. gradually. In this case, the acceleration time is extended as compared with the case I, while the overshooting may be avoided, and may result in an eventual shortened starting time. However, in either case, as far as generators are run in a relatively gentle gradient region of curves, synchronizing of the generator may be accomplished in a satisfactory manner. However, this is not always true with the case where the turbine is run in the region of steep gradients of curves. If the aforesaid conventional methods for starting the turbine are used in such a case, there sometimes arises the failure of synchronizing of the generator. The starting methods of the cases I and II will be described with reference to FIG. 1. The case I refers to a route O-K-X-Y-Z, while the case II refers to a route represented by a curve 7. In either case, when r.p.m. approaches to the rated r.p.m., a variation in flow rate due to a governing action of a governor, and hence a water hammer action take place, presenting a difficulty in the governing action. As a result, a large variation in r.p.m. arises, thus disabling synchronizing of the generator.

SUMMARY OF THE INVENTION

It is an object of the present invention to provide a method for starting a turbine in a positive and stable manner, by avoiding the shortcomings experienced with the prior art methods described, even in case the turbine is run in a region where a gradient of Q1 relative to N1 is steep in a graph representing the characteristic as shown in FIG. 1, due to an increased variation in head.

DESCRIPTION OF THE PREFERRED EMBODIMENTS

Figure 1:
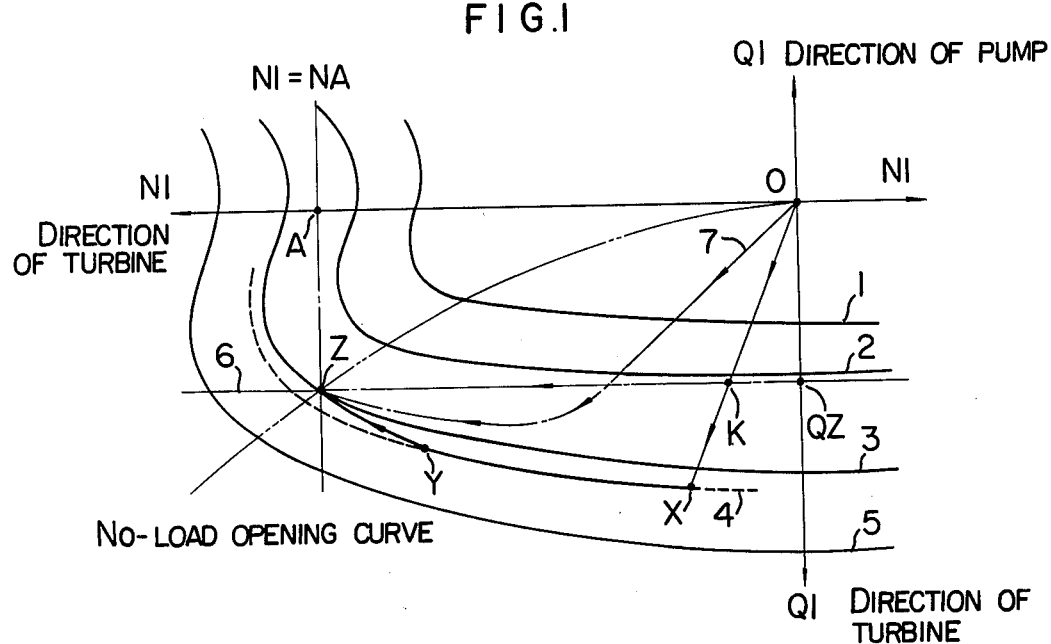
FIG. 1 is a characteristic diagram comparing a conventional starting method with one embodiment of the invention by referring to curves representing the flow rate characteristics of a turbine or pump turbine.
Figure 2:
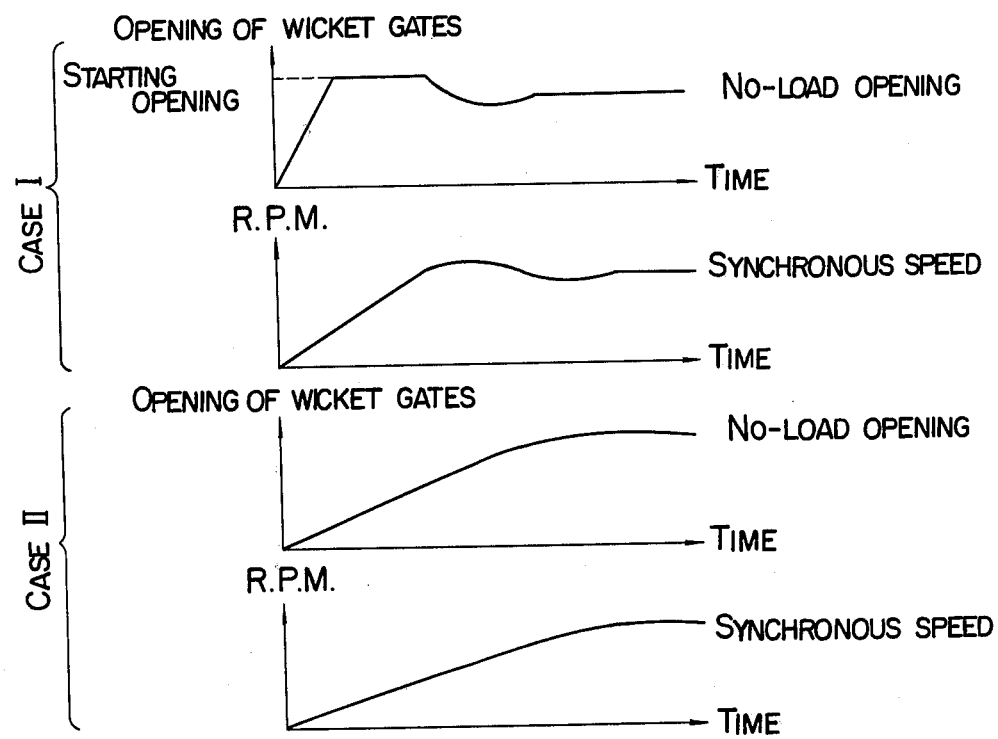
FIG. 2 has graphs showing the relationship of time versus opening of wicket gates, and time versus r.p.m. in two examples of the conventional starting methods for a turbine.
Figure 3:
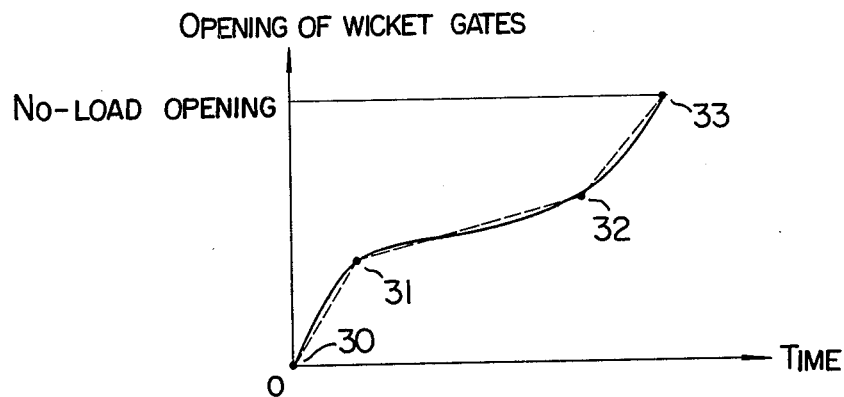
FIG. 3 is a diagram showing the relationship between the time and the opening of wicket gates according to the present invention.

The present invention will now be described in more detail with reference to the accompanying drawings which indicate embodiments of the invention. In FIG. 1, a point Z represents a no-load opening condition at a certain head and rated r.p.m., resulting in N1=NA. In this respect, the flow rate is assumed as QZ. The wicket gates are opened as quickly as possible, for instance, following a route O-K, until the flow rate reaches from a point O (representing a rest condition) to QZ. Thereafter, the wicket gates are gradually opened, following a route K-Z along the line 6 so as to maintain the flow rate at QZ as N increases until N1=NA is reached QZ. Although the flow rate is maintained constant at this time, the route K-Z gradually approaches from the curve 2 to the curve 3 in terms of the opening of wicket gates. In other words, the wicket gates are opened gradually. This reduces variation in flow rate in the neighborhood of a rated r.p.m., and thus avoids a water hammer phenomenon. Accordingly, the synchronizing of the generator may be accomplished in a stable and positive manner to the electric power transmission system. FIG. 3 shows the relationship beween the time and openings of wicket gates in this case. In case a difficulty is encountered with the control of wicket gates according to the curves as shown by a solid line, the wicket gates may be alternatively controlled according to a line shown by a broken line, which approximates the above curve.

Meanwhile, comparison is made to the opening conditions of wicket gates shown in FIGS. 1 and 3. A line O-K in FIG. 1 refers to an opening operation of wicket gates in a range of 30 to 31 in FIG. 3, in which the wicket gates are quickly opened up to a desired flow rate QZ. As the r.p.m., i.e. N1 of the runner (not shown) is increased after the wicket gates have once attained an opening of wicket gates corresponding to the flow rate QZ, the flow rate tends to be decreased and no longer remains at QZ. Therefore according to the present invention the wicket gates are opened with increased r.p.m. to an extent to compensate for such a tendency to decrease the flow rate. In other words, the wicket gates are opened as the r.p.m. is increased, for maintaining a flow rate at QZ in a range of K-Z in FIG. 1. In this case, the wicket gates are gradually opened, as represented by a line covering from a point 31 to a point 33.

Figure 4:
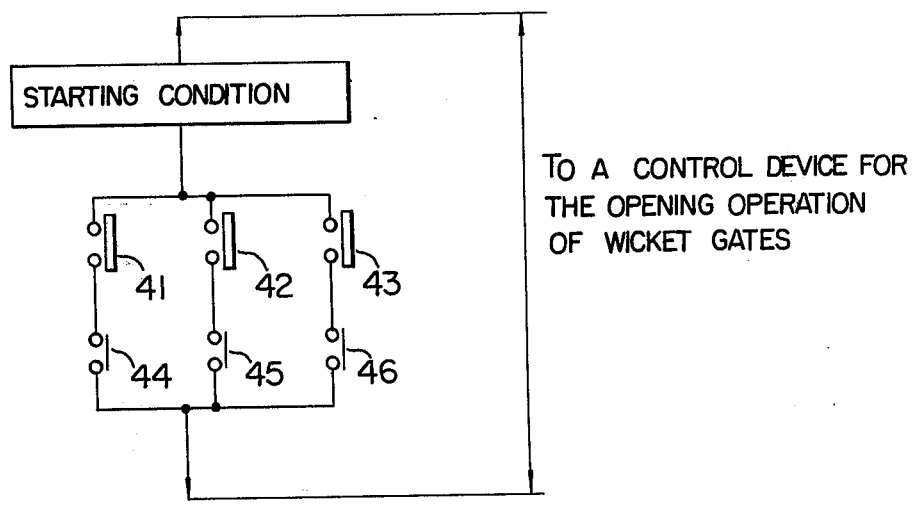
FIG. 4 is a circuit diagram showing one embodiment of a control device for use in a method for controlling the opening of wicket gates, as shown in FIG. 3.

FIG. 4 shows one example of a control device for embodying a starting method as shown by a broken line in FIG. 3. Shown at 41, 42, and 43 in FIG. 4 are switches which are adapted to be closed only when wicket gates remain at openings corresponding to ranges of 30-31, 31-32, and 32-33 in FIG. 3, respectively and to be opened at openings other than these. The pulsing relay contacts 44, 45, 46 close periodically with certain pauses as adjusted corresponding to gradients of the segments of lines 30-31, 31-32, 32-33, respectively.

More particularly, the opening speed of wicket gates in a range of 30-33 of FIG. 3 is controlled in three steps according to dotted line pattern shown in FIG. 3, by the apparatus of FIG. 4 of governor which controls the opening speed of wicket gates.

According to the present invention, there is provided a method for starting a turbine, which method allows the synchronizing of the generator to the electric power transmission system in a stable and positive manner, even in case the turbine has to be run in a region of a steep gradient of Q1 relative to N1 as in a graph (FIG. 1) representing the flow-rate characteristics of a turbine.

What is claimed is:

1. A method for starting a hydraulic turbine system having a generator, a turbine with a runner coupled to drive the generator at a rated r.p.m., and wicket gates for adjusting the flow rate of water running into the runner, comprising the steps of:

quickly opening the wicket gates from a fully closed condition of the rates until the flow rate of the water reaches the fixed flow rate that corresponds to operation of the turbine at rated r.p.m. and the design no-load wicket gate opening for the head during the step;

thereafter slowing opening the wicket gates to maintain the fixed flow rate as the speed increases to the rated r.p.m., to thereby compensate for the tendency to reduce turbine flow rate with an increase in r.p.m. of the runner; and thereafter synchronizing the turbine-generator at no-load to an electric power transmission system.

2. A method as defined in claim 1, wherein no matter how quick the wicket gates have been opened and how much overshooting of the wicket gates beyond said no-load opening has been allowed at the beginning of starting of the turbine, the wicket gates are opened so as to maintain flow rate at approximately the value corresponding to the no-load opening of the wicket gates and the rated speed when the turbine/generator speed approaches the rated value.

* * * * *